(12) United States Patent
Lee

(10) Patent No.: US 10,858,034 B2
(45) Date of Patent: Dec. 8, 2020

(54) STEERING COLUMN FOR VEHICLE

(71) Applicant: MANDO CORPORATION, Gyeonggi-do (KR)

(72) Inventor: Jun Gyu Lee, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/057,809

(22) Filed: Aug. 7, 2018

(65) Prior Publication Data
US 2019/0202488 A1    Jul. 4, 2019

(30) Foreign Application Priority Data

Jan. 4, 2018 (KR) .................. 10-2018-0001235

(51) Int. Cl.
*B62D 1/19*   (2006.01)
*B62D 1/184*  (2006.01)
*B62D 1/187*  (2006.01)

(52) U.S. Cl.
CPC ............ *B62D 1/192* (2013.01); *B62D 1/184* (2013.01); *B62D 1/187* (2013.01); *B62D 1/19* (2013.01); *B62D 1/195* (2013.01)

(58) Field of Classification Search
CPC .......... B62D 1/184; B62D 1/187; B62D 1/19; B62D 1/192; B62D 1/195
See application file for complete search history.

(56) References Cited

U.S. PATENT DOCUMENTS 7,455,320 B2 * 11/2008 Imamura ................ B62D 1/195
                                                   280/777
9,399,481 B2 *  7/2016 Oehri ..................... B62D 1/184
(Continued)

FOREIGN PATENT DOCUMENTS

JP    2011-516323   5/2011
KR    10-1559821    10/2015

OTHER PUBLICATIONS

Office Action dated Aug. 12, 2019 for Korean Application No. 10-2018-0001235 and its English translation by Global Dossier.

*Primary Examiner* — Barry Gooden, Jr.
(74) *Attorney, Agent, or Firm* — Ladas & Parry, LLP

(57) ABSTRACT

The present invention relates to a steering column for a vehicle. According to one embodiment of the present invention, a steering column for a vehicle includes: an outer column including a pair of distance parts protruding from the outer surface of the outer column and facing each other, and an outer circumferential surface having a partially cut-out portion between the pair of the distance parts; an inner column coupled to an inside of the outer column and provided movably in an shaft direction; and a telescopic member formed to absorb an impact load upon a vehicle collision and coupled with the inner column, wherein the telescopic member includes: a fixed gear coupled to the inner column and provided movably in the shaft direction together with the inner column when the inner column moves; a movable gear provided to fix the inner column after the inner column moves in the shaft direction, and provided with a plurality of gear teeth coupled to slit holes of the fixed gear; and an elastic support coupled with the movable gear to provide a fixing force in a direction toward the inner column, and provided so that the movable gear and the fixed gear are coupled with each other, wherein when an impact is applied to the vehicle, the fixed gear is formed to absorb the impact load by causing the inner column to move a predetermined distance and come into contact with a portion of the fixed gear.

9 Claims, 8 Drawing Sheets

(56) References Cited

U.S. PATENT DOCUMENTS

| | | | |
|---|---|---|---|
| 9,428,214 B2* | 8/2016 | Ku | B62D 1/184 |
| 9,834,246 B1* | 12/2017 | Woycik | F16F 7/12 |
| 2006/0181070 A1* | 8/2006 | Imamura | B62D 1/195 |
| | | | 280/777 |
| 2007/0228716 A1* | 10/2007 | Menjak | B62D 1/192 |
| | | | 280/777 |
| 2010/0282016 A1 | 11/2010 | Oehri et al. | |
| 2010/0300238 A1 | 12/2010 | Ridgway et al. | |
| 2012/0024101 A1* | 2/2012 | Schnitzer | B62D 1/195 |
| | | | 74/492 |
| 2012/0125139 A1 | 5/2012 | Tinnin et al. | |
| 2013/0074641 A1* | 3/2013 | Schnitzer | B62D 1/184 |
| | | | 74/493 |
| 2013/0327176 A1* | 12/2013 | Domig | B62D 1/192 |
| | | | 74/492 |
| 2016/0297464 A1* | 10/2016 | Johta | B62D 1/184 |
| 2019/0161108 A1* | 5/2019 | Kwon | B62D 1/184 |
| 2020/0180676 A1* | 6/2020 | Kwon | B62D 1/184 |

* cited by examiner

STEERING COLUMN FOR VEHICLE

CROSS-REFERENCE TO RELATED APPLICATION

This application claims the priority to Korean Patent Application No. 10-2018-0001235 filed in the Korean Intellectual Property Office on Jan. 4, 2018, the entire contents of which is incorporated herein by reference.

TECHNICAL FIELD

The present invention relates to a steering column for a vehicle, and more particularly, to a steering column for a vehicle in which safety of a driver is ensured when the vehicle crashes.

BACKGROUND ART

Generally, a steering column for a vehicle is formed to surround a steering shaft configured to transmit a rotational force, which is generated when a driver manipulates a steering wheel, to a rack-and-pinion mechanism to support the rotation of the steering shaft. Further, the steering column for a vehicle is a device that fixes a position of a steering shaft by being coupled to a vehicle body through a bracket.

Also, the steering column for a vehicle may additionally include a telescope function or a tilt function for the convenience of a driver. Here, a tilt device is a device configured to adjust a fixing angle of a steering wheel, and a telescopic device is formed by inserting two hollow tubes to be extended or retracted in a shaft direction.

FIG. 1 is a perspective view illustrating a conventional steering column for a vehicle.

Referring to FIG. 1, the conventional steering column for a vehicle includes a tilt bracket 120, a cam member 130 having a fixed cam 131 and a movable cam 133, an operation lever 140, a needle bearing 150, a nut 170, capsules 180, and a mounting bracket 190.

An inner tube 103 is inserted into an outer tube 101. The tilt bracket 120 surrounds the outer tube 101 into which the inner tube 103 is inserted.

An adjuster bolt 110 is provided to pass through the tilt bracket 120, and the cam member 130, the operation lever 140, the needle bearing 150 and the nut 170 are sequentially coupled to the adjuster bolt 110.

The mounting bracket 190 is coupled to an upper portion of the tilt bracket 120 and is fixed to a vehicle body via the capsules 180 provided on both sides of the mounting bracket 190.

Further, a plurality of holes 181 are formed in the capsules 180, and molding materials are introduced into the holes 181. In such a conventional steering column for a vehicle, when an impact is applied to the vehicle body, the mounting bracket 190 and the capsules 180 are separated and collapsed while the molding materials are broken.

However, in the case of such a conventional steering column for a vehicle, when the vehicle crashes, the adjuster bolt 110 and the operation lever 140 are collapsed together with the mounting bracket 190 to cause the operation lever 140 to interfere with vehicle packages, thereby putting a driver in a rather dangerous situation.

DISCLOSURE

Technical Problem

The present invention is directed to providing a steering column for a vehicle having an improved coupling force and bearing force in a shaft direction to solve the above-described problems.

Further, the present invention is directed to providing a steering column for a vehicle which absorbs and mitigates an external impact when the vehicle is subjected to the external impact.

The present invention is not limited thereto, and other objects not mentioned herein may be clearly understood by those skilled in the art from the description below.

Technical Solution

One aspect of the present invention provides a steering column for a vehicle including: an outer column having an outer circumferential surface with a partially cut-out portion; an inner column coupled to an inside of the outer column and provided movably in an shaft direction; and a telescopic member formed to absorb an impact load upon a vehicle collision and coupled with the inner column, and the telescopic member includes: a fixed gear coupled to the inner column and provided movably in the shaft direction together with the inner column when the inner column moves; a movable gear provided to fix the inner column after the inner column moves in the shaft direction, and provided with a plurality of gear teeth coupled to slit holes of the fixed gear; and an elastic support coupled with the movable gear to provide a fixing force in a direction toward the inner column, and provided so that the movable gear and the fixed gear are coupled with each other, and when an impact is applied to the vehicle, the fixed gear is formed to absorb the impact load by causing the inner column to move a predetermined distance and come into contact with a portion of the fixed gear.

The elastic support may be inserted and coupled to an insertion groove formed in an upper portion of the movable gear.

The elastic support may include: an elastic body configured to provide an elastic force; a gear insert inserted in the insertion groove formed in an outer side surface of the movable gear to support the movable gear; and a fixture having one end coupled to the elastic body and the other end coupled with the outer column. The fixed gear may include: an upper plate having the slit holes formed therein and disposed on an outer circumferential surface of the inner column; a bending plate coupled to an end of the upper plate and having a bent shape; and a lower plate positioned facing the upper plate and coupled to the bending plate, and when the vehicle is subjected to an impact, the inner column moves a predetermined distance and contacts the bending plate so that the fixed gear absorbs an impact load.

The telescopic member may further include a stopper, which is disposed on the fixed gear, has a width wider than that of the slit hole formed in the upper plate, positioned adjacent to the bending plate, and provided to absorb an impact load when the vehicle is subjected to an impact.

The telescopic member may further include a fixing part configured to fix the fixed gear to the inner column and absorb an impact load when the vehicle is subjected to an impact.

The outer column may include a pair of distance parts protruding from the outer surface of the outer column and facing each other, and an outer circumferential surface having a partially cut-out portion between the pair of the distance parts; the telescopic member further includes an adjuster bolt passing through the pair of distance parts to be coupled with an external operation lever; and the adjuster bolt is coupled to the movable gear while passing through a bolt insertion hole formed in the movable gear, and the bolt insertion hole may include: a main hole having a circular-shaped cross section; and one or more protrusion holes protruding from one end of the main hole and into which a protrusion formed on an outer circumferential surface of the adjuster bolt is inserted.

An angle formed between the gear teeth of the movable gear and an upper surface of the fixed gear may be within a predetermined angle range in a state before the gear teeth of the movable gear is coupled with the upper surface of the fixed gear, and the protrusion holes are formed to correspond to the angle.

The predetermined angle range may be between 10 to 15 degrees.

Advantageous Effects

According to one embodiment of the present invention, a movable gear and a fixed gear can be stably coupled to each other due to bottom tension which is stably acting from an elastic support to the fixed gear even when gear teeth are not coupled to slit holes.

Further, according to one embodiment of the present invention, the movable gear and an adjuster bolt can be stably supported through first and second protrusion holes formed inside the movable gear.

According to one embodiment of the present invention, even when a vehicle is subjected to a strong impact from the outside, such an impact can be absorbed to improve durability of the steering column for a vehicle.

Also, according to one embodiment of the present invention, even when an external impact is applied to a vehicle, the steering column for a vehicle can absorb the impact due to a coupling structure and shape of the fixed gear, a structure in which an inner column collides with a part of the fixed gear to absorb the impact, and a structure in which the fixed gear absorbs the impact load.

The effects of the present invention are not limited to the above-described effects, and the effects not mentioned may be clearly understood by those skilled in the art from the present specification and the accompanying drawings.

MODES OF THE INVENTION

Figure 1:
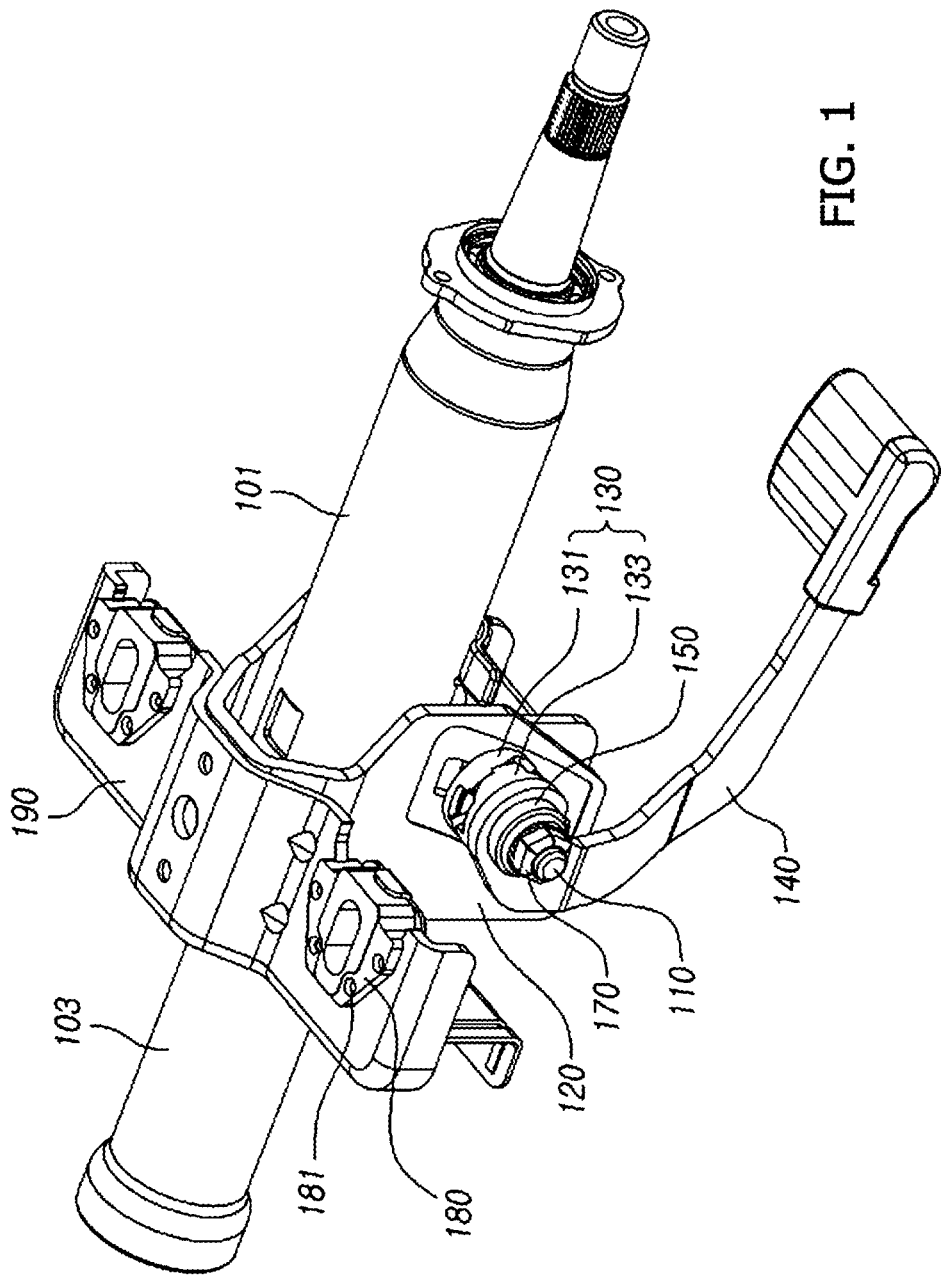
FIG. 1 is a perspective view illustrating a conventional steering column for a vehicle.

Hereinafter, embodiments of the present invention will be described in detail with reference to the accompanying drawings. The embodiments of the present invention may be modified in various forms, and the scope of the present invention should not be construed as being limited to the following embodiments. The embodiments are provided to more completely explain the present invention to those of ordinary skill in the art. Thus, the shape of the elements in the drawings may be exaggerated in order to emphasize a clearer description. Further, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Figure 2:
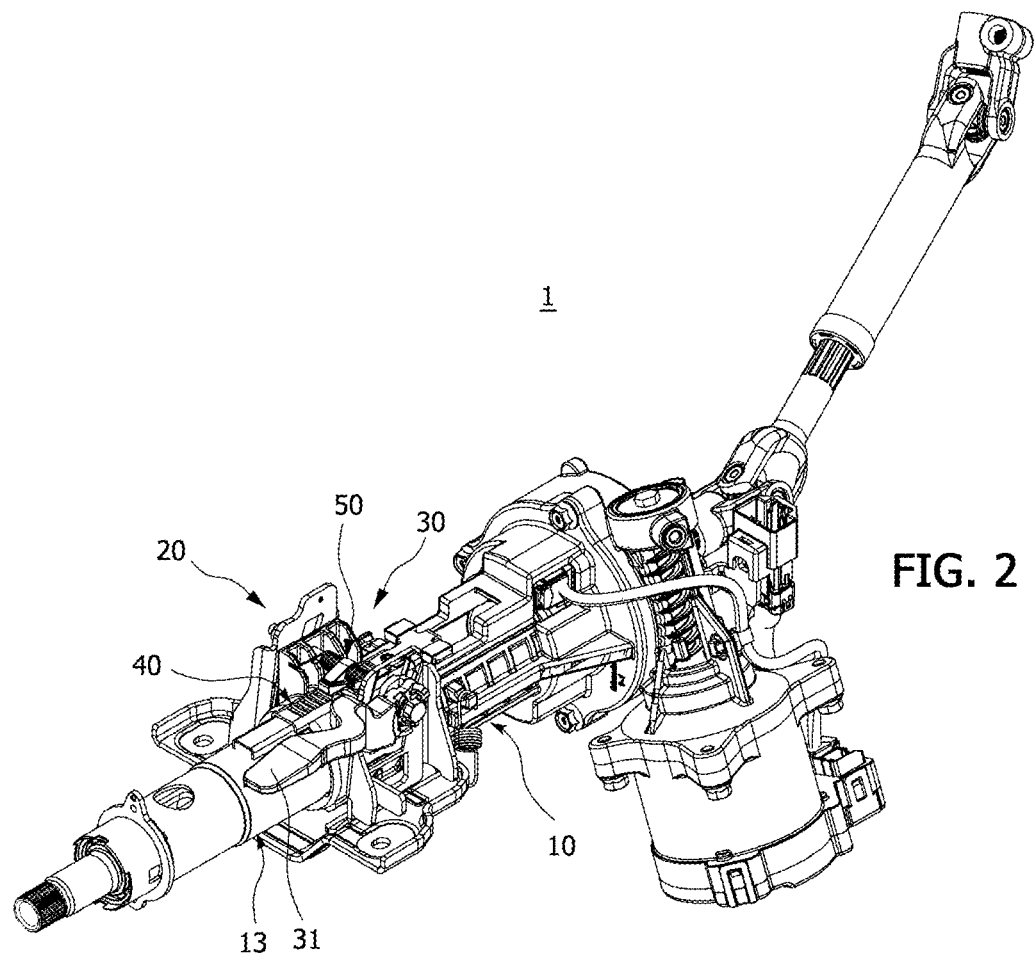
FIG. 2 is a perspective view illustrating a steering column for a vehicle according to one embodiment of the present invention.
Figure 3:
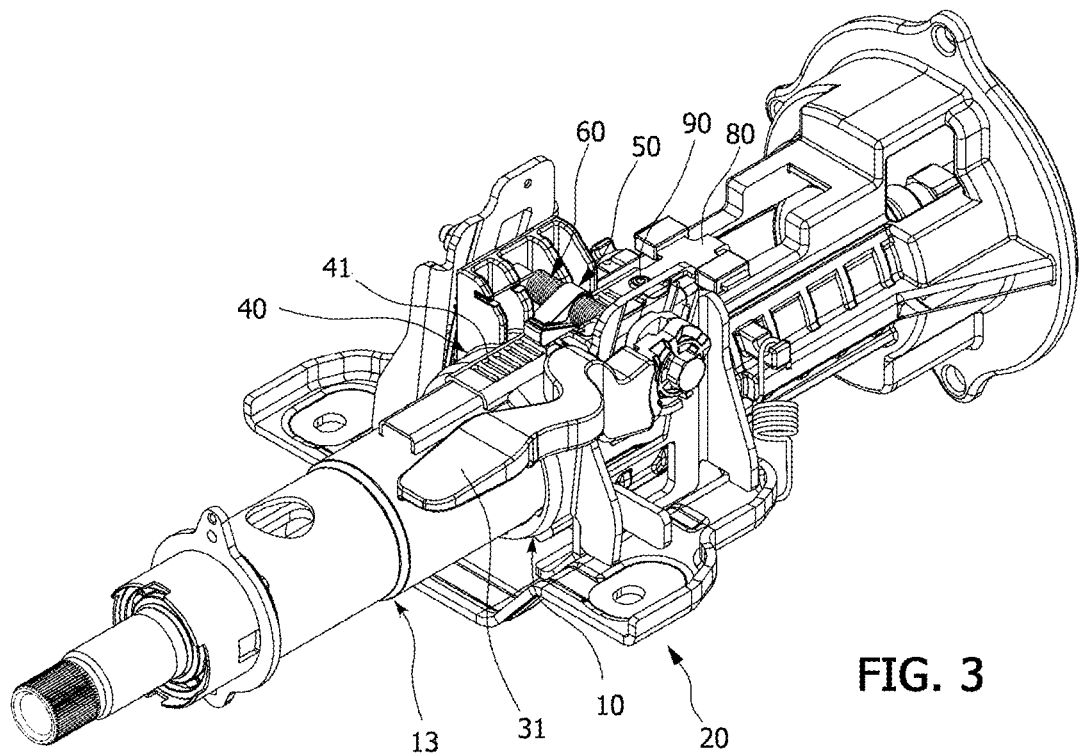
FIG. 3 is a perspective view illustrating a part of the steering column for a vehicle according to one embodiment of the present invention.
Figure 4:
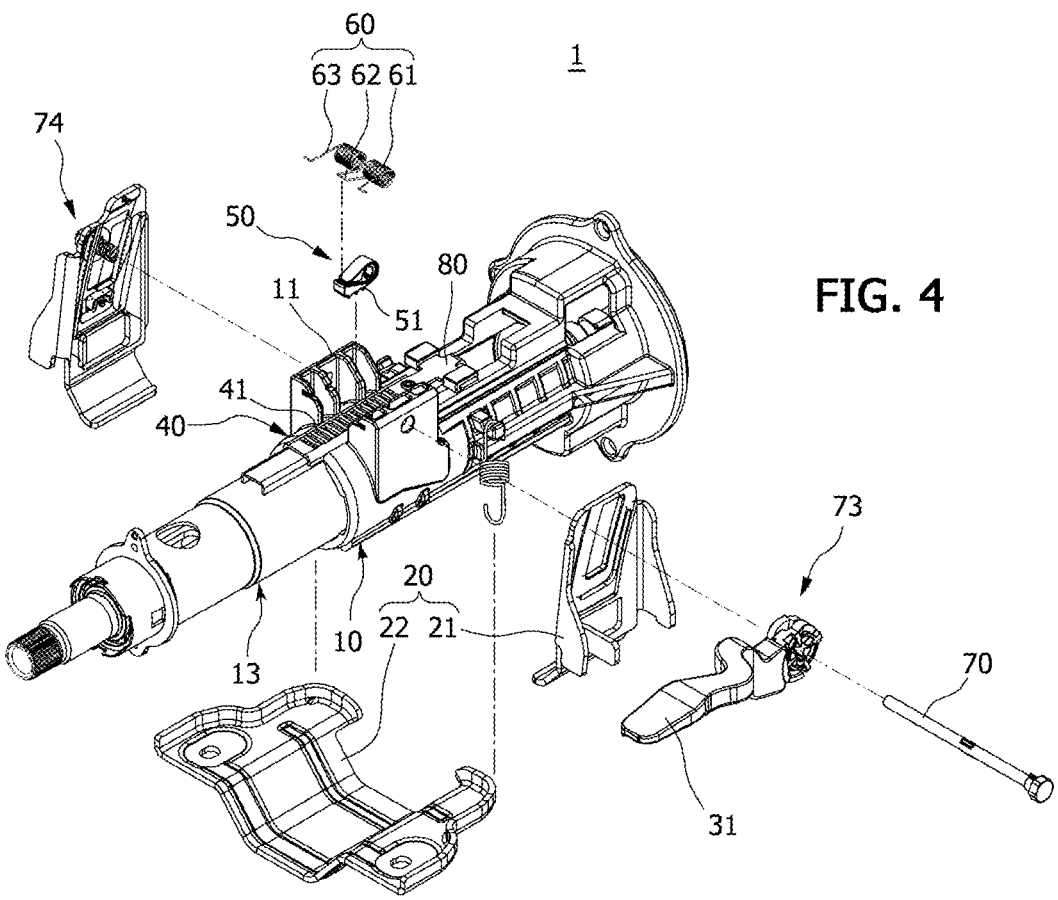
FIG. 4 is an exploded perspective view illustrating the steering column for a vehicle according to one embodiment of the present invention.
Figure 5:
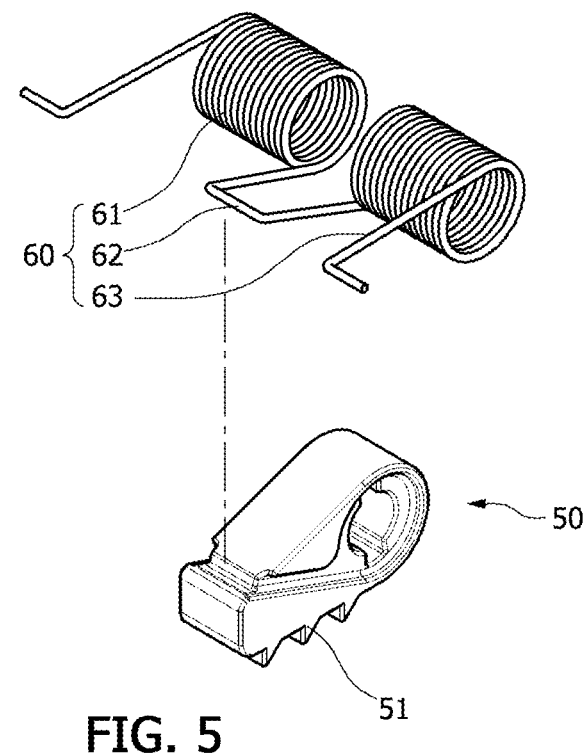
FIG. 5 is an exploded perspective view illustrating a movable gear and an elastic support of FIG. 3.
Figure 6:
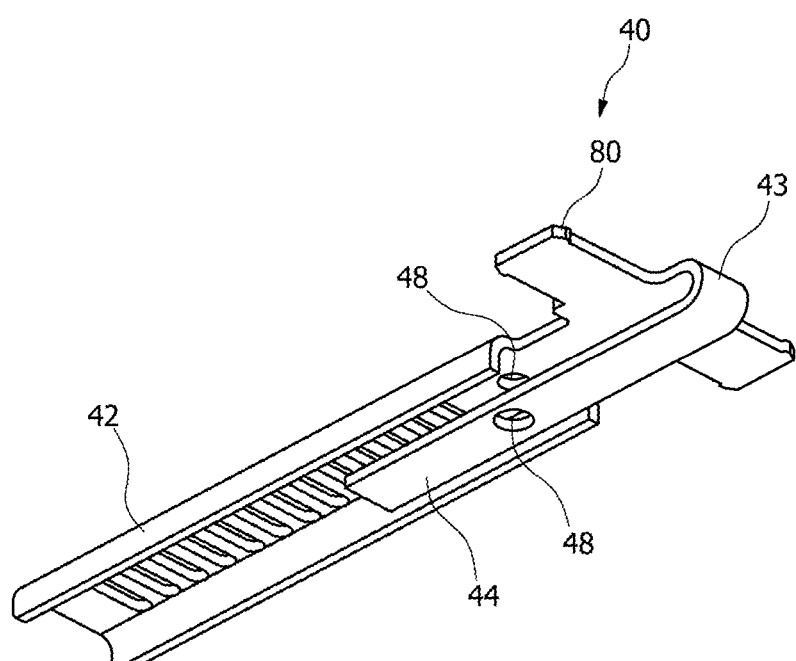
FIG. 6 is a perspective view illustrating a fixed gear.
Figure 7:
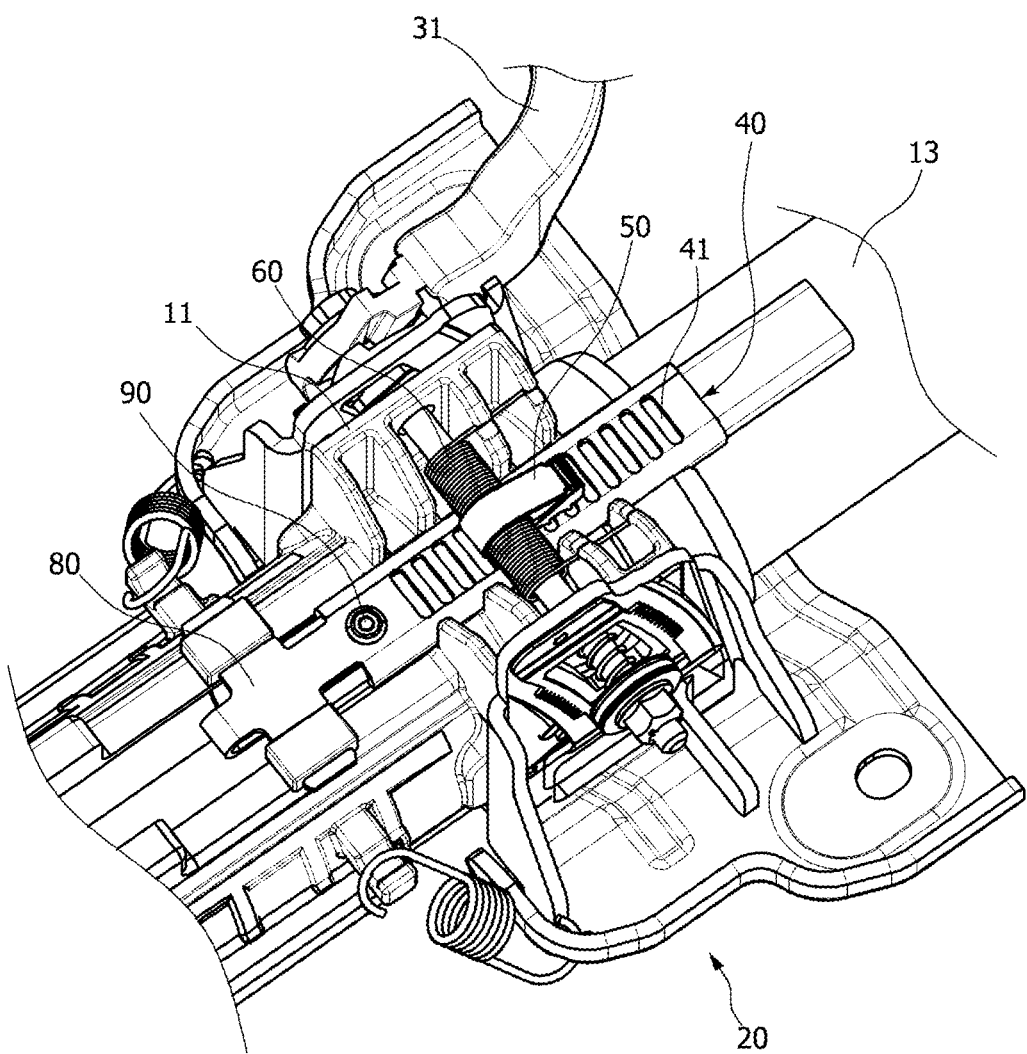
FIG. 7 is an enlarged perspective view illustrating the movable gear and the fixed gear.
Figure 8:
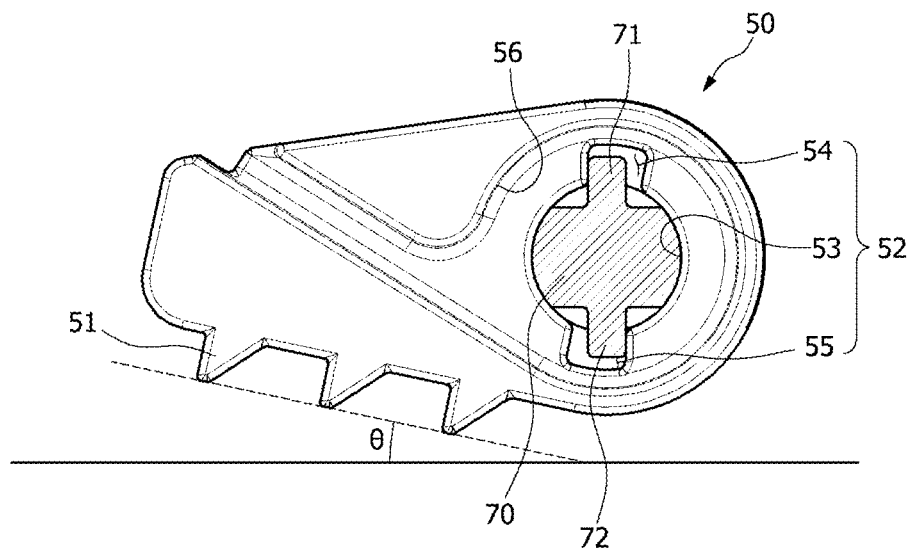
FIGS. 8 and 9 are side views illustrating a state before and after the movable gear and the fixed gear are coupled to each other.
Figure 9:
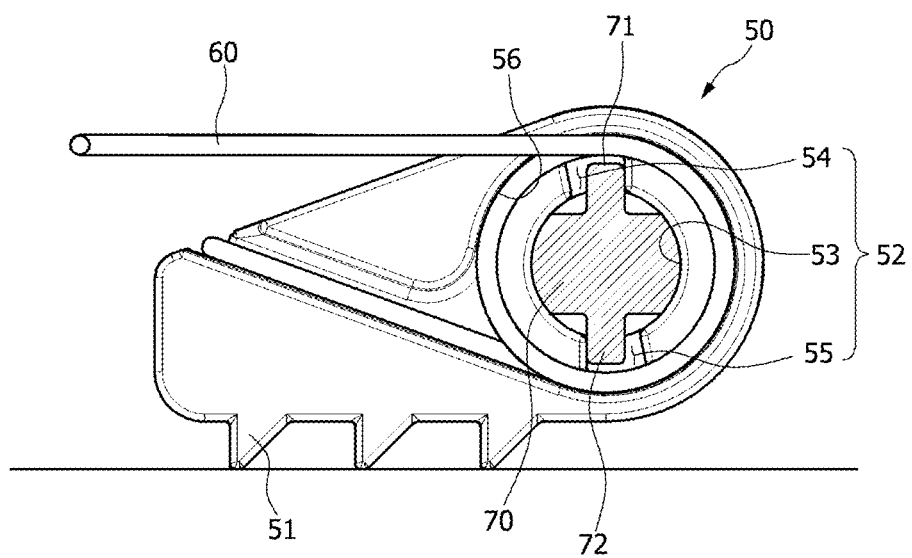

FIG. 2 is a perspective view illustrating a steering column for a vehicle according to one embodiment of the present invention, FIG. 3 is a perspective view illustrating a part of the steering column for a vehicle according to one embodiment of the present invention, FIG. 4 is an exploded perspective view illustrating the steering column for a vehicle according to one embodiment of the present invention, FIG. 5 is an exploded perspective view illustrating a movable gear and an elastic support of FIG. 3, FIG. 6 is a perspective view illustrating a fixed gear, FIG. 7 is an enlarged perspective view illustrating the movable gear and the fixed gear, and FIGS. 8 and 9 are side views illustrating a state before and after the movable gear and the fixed gear are coupled to each other.

Referring to FIGS. 2 to 9, a steering column for a vehicle 1 includes an outer column 10, an inner column 13, a tilt bracket 20, and a telescopic member 30.

The inner column 13 may be inserted inside the outer column 10. A steering shaft may be provided so as to pass through the inner column 13 and the outer column 10. The steering shaft may be connected to a steering wheel.

The inner column 13 may move in a shaft direction inside the outer column 10. As an example, the inner column 13 may be coupled to an adjuster bolt 70 coupled to an operation lever 31 to be described below, a movable gear 50, and a fixed gear 40. Here, the inner column 13 moves a predetermined distance in the shaft direction to be coupled to the fixed gear 40 and the movable gear 50 by a configuration of the fixed gear 40 and the movable gear 50.

The outer column 10 may have an inner space. The inner column 13 may be located inside the outer column 10. The outer column 10 may have a distance part 11. The distance part 11 may protrude from an outer surface of the outer column 10.

A pair of distance parts 11 may be formed on the outer surface of the outer column 10. The pair of distance parts 11 may be formed facing each other. The pair of distance parts 11 may be spaced apart from each other by a certain distance. Through holes 12 may be formed in the pair of distance parts 11.

The through holes 12 may be coupled with the adjuster bolt 70 to be described below. The through hole 12 may be formed in an elliptical shape. The through holes 12 may be formed such that the adjuster bolt 70 can be easily assembled therewith.

The distance part 11 may have a shape extending from the outer column 10 on both sides in which a part of an outer circumferential surface of the outer column 10 is cut.

The tilt bracket 20 may be disposed on both sides of the distance parts 11. The tilt bracket 20 may be formed in a substantially "⋂" shape. Tilt long holes are formed in both sides of the tilt bracket 20 so as to face each other.

Upper mounting brackets 21 formed by bending and extending from both sides of the tilt bracket 20 and a lower mounting bracket 22 coupled to an end of the outer column 10 are coupled to a vehicle body so that the steering column for a vehicle 1 is fixed to the vehicle body.

The lower mounting bracket 22 may be spring-coupled to the steering column for a vehicle 1.

The telescopic member 30 is formed to absorb an impact load exceeding a preset range, which is applied when the vehicle crashes, and may be disposed on an outer circumferential surface of the outer column 10. The telescopic member 30 may be coupled to the inner column 13.

The telescopic member 30 includes the fixed gear 40, the movable gear 50, an elastic support 60, the adjuster bolt 70, a stopper 80, and a fixing part 90.

The fixed gear 40 may be disposed on the outer circumferential surface of the inner column 13. The fixed gear 40 may have a plurality of slit holes 41 formed therein. The plurality of slit holes 41 are disposed in parallel in the shaft direction, and may be spaced apart from each other by a certain distance. Here, the shaft direction is defined as a direction in which the steering shaft is coupled.

The fixed gear 40 may be coupled to the inner column 13. The fixed gear 40 may be fixed at a specific position of the inner column 13 by the movable gear 50 to be described below. Further, the fixed gear 40 may be formed with a structure capable of absorbing an impact when the impact is applied to the vehicle, thereby mitigating the impact load and improving durability.

The fixed gear 40 may be formed to extend in the shaft direction.

The slit holes 41 are coupled with gear teeth 51 formed in the movable gear 50 to be described below to allow the movable gear 50 to be coupled to the fixed gear 40.

The fixed gear 40 includes an upper plate 42, a bending plate 43, and a lower plate 44.

The slit holes 41 may be formed in the upper plate 42. The upper plate 42 may be disposed on an outer surface of the inner column 13. The upper plate 42 may be formed in a shape extending along the longitudinal direction which is the shaft direction. The stopper 80 may be provided at an end of the upper plate 42.

A rivet hole 48 may be formed in the upper plate 42 so that the fixing part 90 to be described below is coupled thereto.

When the vehicle is subjected to an impact and the inner column 13 moves and hits the fixed gear 40, the stopper 80 may absorb some impact thereof. The stopper 80 may be disposed in the fixed gear 40.

The stopper 80 may have a width greater than a width of the slit hole 41 formed in the upper plate 42. Here, the width is a direction perpendicular to the shaft direction when viewed from above, and the stopper 80 may be provided with a width greater than the width of the slit hole 41.

The stopper 80 may be positioned adjacent to the bending plate 43 to be described below. As an example, the stopper 80 may be provided as a damper. As an example, the stopper 80 may be provided as a rubber damper.

The bending plate 43 may be coupled to the upper plate 42. The bending plate 43 may be coupled to the end of the upper plate 42 at which the stopper 80 is formed. The bending plate 43 may have a bent shape. The bending plate 43 may have a bent surface protruding in the shaft direction.

The lower plate 44 may be coupled to the bending plate 43. The lower plate 44 may be positioned face-to-face with the upper plate 42. The lower plate 44 may have a length smaller than a length of the upper plate 42. The upper plate 42, the bending plate 43, and the lower plate 44 may be coupled to each other to form an inner space.

Hereinafter, a process in which the fixed gear 40 absorbs an impact when the vehicle is subjected to the impact will be described.

Figure 10:
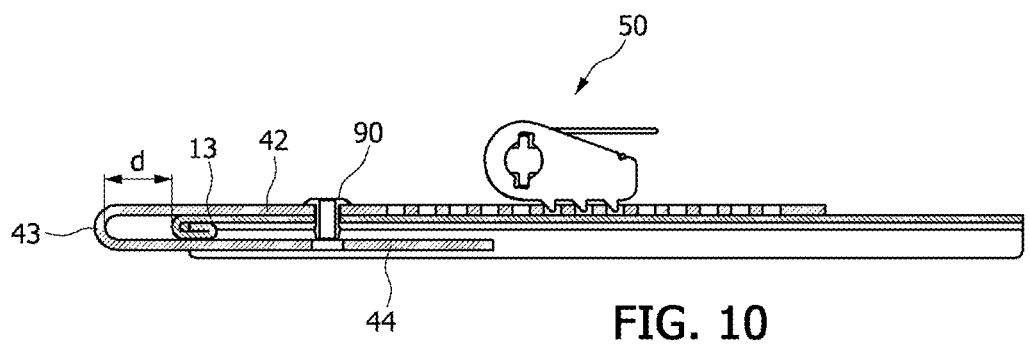
FIG. 10 is a side view schematically illustrating a part of the inner column, the fixed gear, and the movable gear.

FIG. 10 is a side view schematically illustrating a part of the inner column, the fixed gear, and the movable gear.

Referring to FIG. 10, the inner column 13 may be coupled through the fixed gear 40 and the movable gear 50. The inner column 13 may move to a desired position in the shaft direction and may be fixed at a specific position through the fixed gear 40 and the movable gear 50.

When the vehicle is subjected to an external impact, the coupling between the inner column 13 and the fixed gear 40 is released while the fixing part 90 is broken, and the inner column 13 moves a predetermined distance d to collide with an inner surface of the bending plate 43. In this case, the impact transmitted to the fixed gear 40 is transmitted to the fixing part 90, the upper plate 42, the lower plate 44, and the bending plate 43, and the transmitted impact may be absorbed by each of these structures to mitigate the impact.

Figure 11:
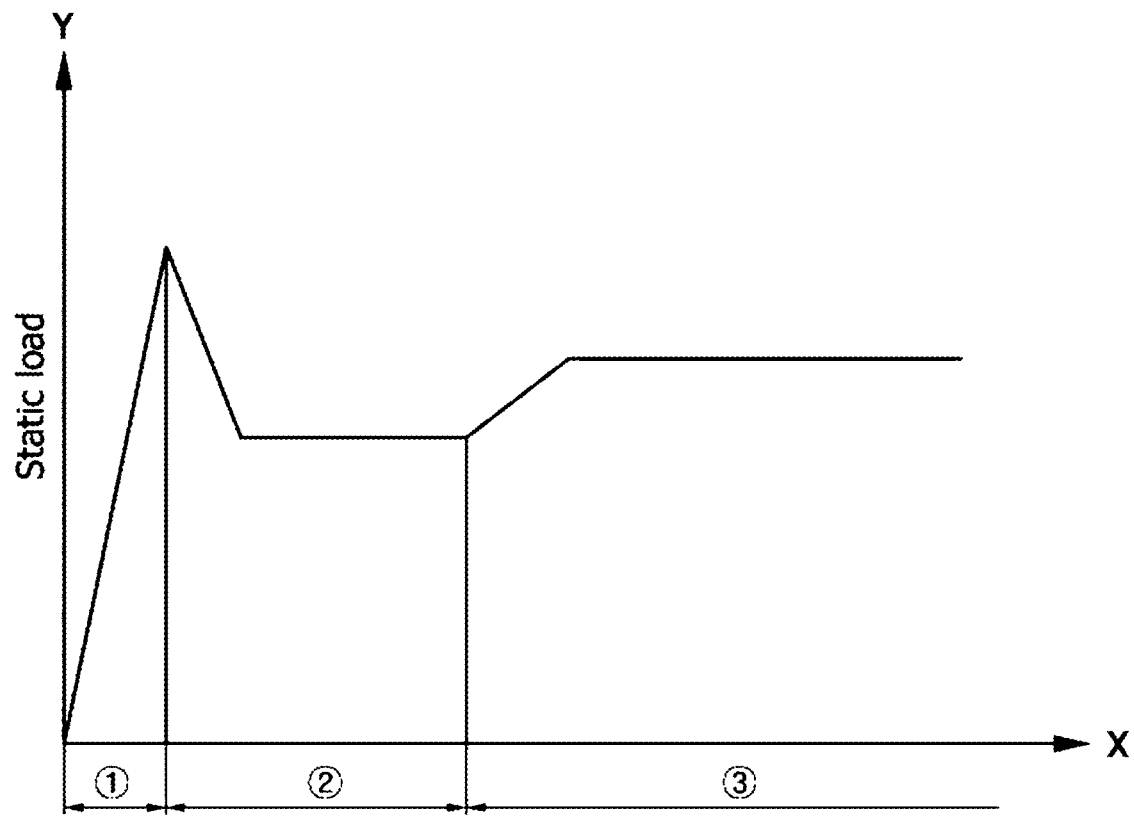
FIG. 11 is a graph schematically illustrating a static load applied to the steering column for a vehicle of the present invention when the vehicle is subjected to an external impact.

FIG. 11 is a graph schematically illustrating a static load applied to the steering column for a vehicle 1 of the present invention when the vehicle is subjected to an external impact.

Referring to this, in the embodiment of the present invention, it can be seen that the steering column for a vehicle 1 receives a more stable static load after the initial impact when the vehicle is subjected to an external impact such as a vehicle crash. This shows that the external impact may be mitigated by the above-described driving, and the impact may be divided and absorbed by the configuration of the movable gear 50, the fixed gear 40, the elastic support 60, and the stopper 80, thereby improving durability of the steering column device for a vehicle.

Specifically, the steering column for a vehicle is subjected to the same load as in No. 1 in FIG. 11 during the initial impact. Thereafter, as described above, by the movement of the inner column 13 and an impact mitigation mechanism of the fixed gear 40, the impact is applied as in No. 2 and No. 3, and finally, the impact load may be maintained constant as in No. 3 without increasing more than a certain load. Thereby, durability of the steering column for a vehicle may be improved.

The movable gear 50 may be coupled to the fixed gear 40. The gear teeth 51 may be formed at a part of the movable gear 50. As an example, a plurality of gear teeth 51 may be formed on a surface of the movable gear 50 facing the fixed gear 40. The plurality of gear teeth 51 may be coupled to some slit holes 41 of the plurality of slit holes 41 formed in the fixed gear 40 to fix the fixed gear 40 and the movable gear 50. Through this, a bearing force of the adjuster bolt 70 and the operation lever 31 may be improved.

A bolt insertion hole 52 may be formed in the movable gear 50. The adjuster bolt 70 may be coupled to the bolt insertion hole 52. The movable gear 50 in which the bolt insertion hole 52 is formed may be formed in a cylindrical shape. The overall shape of the movable gear 50 may be similar to a whistle shape.

A surface of the movable gear 50 on which the gear teeth 51 are formed may be provided to be inclined upward in one direction. The surface of the movable gear 50 on which the gear teeth 51 are formed and an upper surface of the fixed gear 40 may be within a predetermined angle θ. Here, the angle formed by the two surfaces is an angle formed in a state before the gear teeth 51 of the movable gear 50 is coupled to an upper surface of the fixed gear 40, that is, the angle formed by an innermost tooth of the gear teeth 51 in a tooth-on tooth state.

Meanwhile, the movable gear 50 provides a protrusion hole in which a protrusion of the adjuster bolt 70 may move so as to correspond to the above-described angle θ as will be described below.

As an example, the predetermined angle range may be between 10 to 15 degrees. Preferably, the angle formed by the two surfaces may be 12 degrees.

The operation lever 31 may be in a completely locked state even when a state before the gear teeth 51 and the slit holes 41 of the fixed gear 40 are coupled to each other occurs due to the configuration related to the angle θ. Such a completely locked state may be achieved by making the gear teeth 51 and the slit holes 41 in a completely coupled state by tension acting at lower portions thereof, which is applied to the fixed gear 40 by the elastic support 60 to be described below, even when the gear teeth 51 and the slit holes 41 are not completely coupled to each other. Also, the gear teeth 51 may move with a force acting in the steering shaft direction and may be completely coupled to other slit holes 41 of the fixed gear 40, thereby exhibiting a stable bearing force. Hereinafter, tension of the elastic support 60 will be described.

The bolt insertion hole 52 includes a main hole 53, a first protrusion hole 54, and a second protrusion hole 55.

The main hole 53 may have a circular-shaped cross section. The first protrusion hole 54 may protrude from one end of the main hole 53. A first protrusion 71 of the adjuster bolt 70 may be inserted into the first protrusion hole 54.

The second protrusion hole 55 may be positioned facing the first protrusion hole 54. The second protrusion hole 55 may be formed so as to protrude from one end of the main hole 53. A second protrusion 72 of the adjuster bolt 70 may be inserted into the second protrusion hole 55. The second protrusion hole 55 may be disposed more adjacent to the fixed gear 40 rather than the first protrusion hole 54.

The first protrusion hole 54 and the second protrusion hole 55 provide spaces in which the first and second protrusions 71 and 72 may move so that the adjuster bolt 70 corresponds to the above-described angle θ, which allows the operation lever 31 to be completely locked even in a state before the gear teeth 51 are coupled to the slit holes 41 of the fixed gear 40.

The elastic support 60 may be provided to surround the adjuster bolt 70. The elastic support 60 may be coupled to the outer column. The elastic support 60 surrounds the adjuster bolt 70 and may be coupled to the movable gear 50 to provide tension from the movable gear 50 to the fixed gear 40. As an example, the elastic support 60 may be provided with a spring having an elastic force. Alternatively, the elastic support 60 may be used without limitation as long as the elastic support 60 can have an elastic force and be coupled to the movable gear 50 to generate tension in the fixed gear 40.

The elastic support 60 includes an elastic body 61, a gear insert 62, and a fixture 63.

The elastic body 61 may be provided to surround the adjuster bolt 70. The elastic body 61 may be positioned between a pair of distance parts 11. The elastic body 61 may be provided to surround a center region of the adjuster bolt 70 positioned between the pair of distance parts 11.

The gear insert 62 may have one end which may be coupled to the elastic body 61 and the other end which may be inserted into an insertion groove 56 formed on the movable gear 50. The overall shape of the gear insert 62 may be similar to a 'U' shape.

One end of the fixture 63 may be coupled to the elastic body 61 and the other end of the fixture 63 may be coupled to the outer column. The fixture 63 may be provided so that the elastic support 60 may be stably supported on the outer column 10 by being coupled to the outer column.

The elastic support 60 may be inserted into the insertion groove 56 formed in an upper portion of the movable gear 50 to provide tension that causes the movable gear 50 to always be directed toward the fixed gear 40. Such tension may prevent the movable gear 50 from moving or the coupling of the movable gear 50 from being released due to the action of the shaft direction force of the steering shaft even when the movable gear 50 is not coupled to the fixed gear 40, thereby maintaining a completely locked state. Also, the impact may be mitigated or absorbed when the vehicle is subjected to an external impact.

As described above, according to the present invention, the elastic force of the elastic support 60, the movement of the movable gear 50 in the shaft direction, and the plate shape of the fixed gear 40 may absorb the static load, thereby mitigating or absorbing external impacts. Also, through this, a stable shaft direction bearing force may be achieved.

The adjuster bolt 70 may pass through the operation lever 31, the pair of distance parts 11, the movable gear 50, and the tilt bracket 20. A cam member 73 and a bolt fixing part 74 may be coupled to the adjuster bolt 70.

The first protrusion 71 and the second protrusion 72 may be formed on the adjuster bolt 70. The first protrusion 71 may be inserted into the first protrusion hole 54 and the second protrusion 72 may be inserted into the second protrusion hole 55.

The fixing part 90 may fix the fixed gear 40 to the inner column 13. The fixing part 90 may be provided as a known device capable of fixing the fixed gear 40 to the inner column 13, such as a rivet or bolt. A plurality of fixing parts 90 may be provided. The fixing part 90 may absorb a part of the impact load transmitted through the inner column 13 when the vehicle is subjected to an impact.

As described above, when an impact is applied to the vehicle, the impact load transmitted due to the movement of the inner column 13 may be absorbed through the fixed gear 40, the movable gear 50, and the fixing part 90.

Also, in the present invention, when the movable gear 50 is coupled to the fixed gear 40, a coupling force between the gear teeth 51 and the slit holes 41 may be maintained by a fixing force of the elastic support 60 even when the gear teeth 51 are not fastened to the slit holes 41.

In a tilt operation of the steering column for a vehicle 1 of the present invention, the driver may unlock the operation lever 31 by rotating the operation lever 31 in one direction. The driver may place the inner column 13 at a desired tilt position. Thereafter, when the operation lever 31 is rotated in the other direction and locked, the inner column 13 is pushed toward the tilt bracket 20 by a cam step of the cam member 73. Accordingly, as the tilt bracket 20 is tightened, the position of the inner column 13 is fixed while both sides of the distance part 11 are closely contacted and pressed, thereby completing the tilt operation.

Likewise, in a telescopic operation through the telescopic member 30, the driver rotates the operation lever 31 in one direction, places the inner column 13 at the desired telescopic position after the gear teeth 51 of the movable gear 50 and the slit holes 41 of the fixed gear 40 are coupled to each other, and rotates the operation lever 31 again in the other direction, thereby completing the telescopic operation while the position of the inner column 13 is fixed.

When the vehicle crashes, the inner column 13 is slidably moved in the outer column 10 so that the gear teeth 51 are coupled to and engaged with the slit holes 41 and the telescopic member 30 is rotated due to an impact load to absorb the impact load, and only the inner column 13 is slidably moved in the outer column 10 while the upper mounting brackets 21 are coupled to the vehicle body so that interference between the operation lever 31 and the vehicle package may be prevented, thereby ensuring the safety of the driver.

As described above, according to one embodiment of the present invention, the movable gear and the fixed gear may be stably coupled to each other due to bottom tension which is stably acting from the elastic support to the fixed gear even when gear teeth are not coupled to slit holes.

Further, according to one embodiment of the present invention, the movable gear and the adjuster bolt may be stably supported through the first and second protrusion holes formed inside the movable gear.

According to one embodiment of the present invention, even when the vehicle is subjected to a strong impact from the outside, such an impact may be absorbed to improve durability of the steering column for a vehicle.

Also, according to one embodiment of the present invention, even when an external impact is applied to a vehicle, the steering column for a vehicle may absorb the impact due to a coupling structure and shape of the fixed gear, a structure in which the inner column collides with a part of the fixed gear to absorb the impact, and a structure in which the fixed gear absorbs the impact load.

Figure 12:
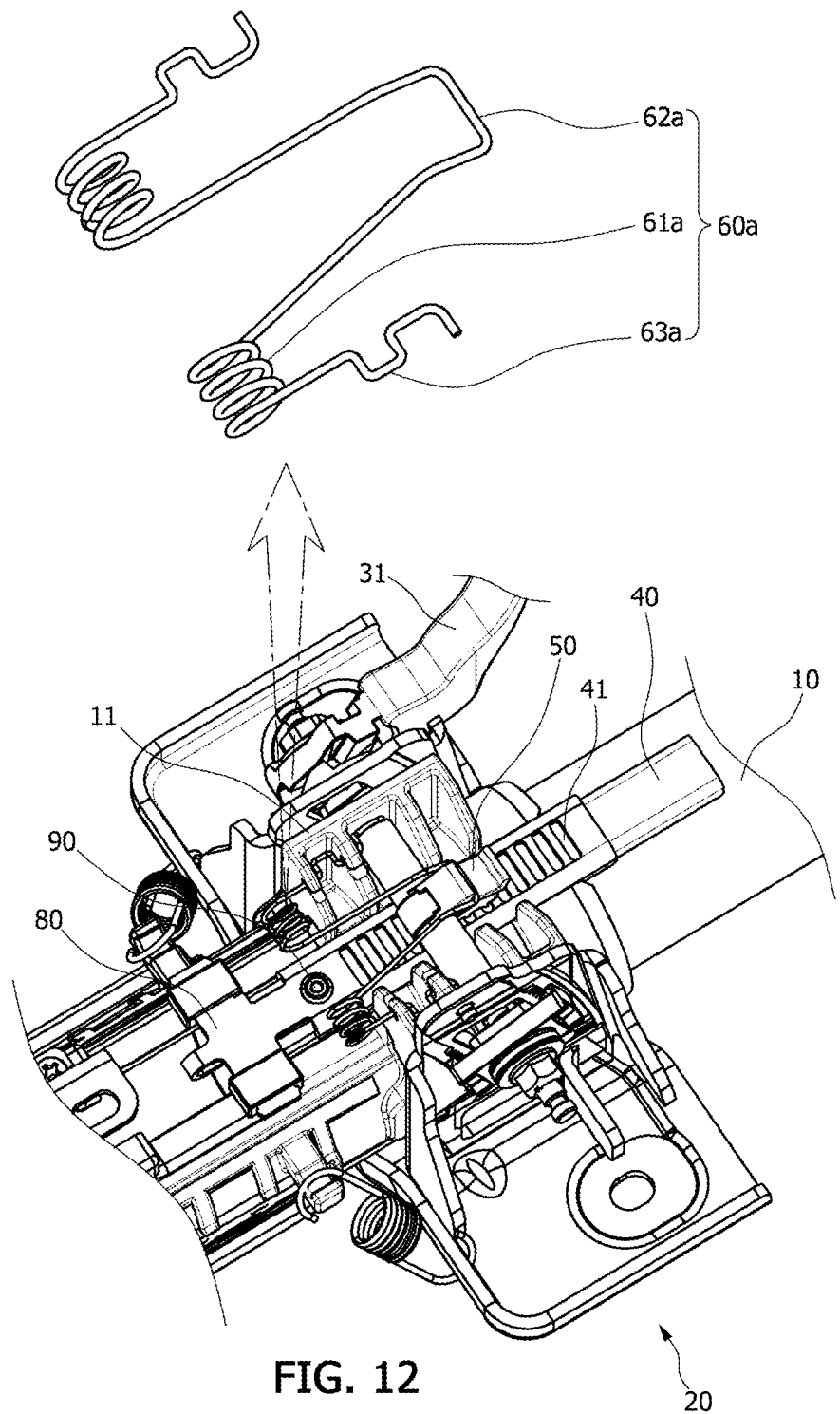
FIG. 12 is an enlarged perspective view illustrating a movable gear and a fixed gear of a steering column for a vehicle according to another embodiment of the present invention.

Further, FIG. 12 is an enlarged perspective view illustrating the movable gear and the fixed gear of the steering column for a vehicle according to another embodiment of the present invention.

Referring to FIG. 12, another type of elastic support 60a which is different from the elastic support 60 of the above-described steering column for a vehicle according to one embodiment of the present invention is shown. According to another embodiment of the present invention as shown in FIG. 12, the elastic support 60a includes an elastic body 61a, a gear insert 62a, and a fixture 63a, and the elastic body 61a is disposed not to surround the adjuster bolt 70 but is disposed on the outer column 10 to be spaced apart from the adjuster bolt 70. Accordingly, a shape in which the gear insert 62a is inserted into the movable gear 50 and a position of the outer column 10 to which the fixture 63a is coupled are somewhat different. However, this type of elastic support 60a also performs the same function of providing tension to the movable gear 50 in a direction of the fixed gear 40.

The foregoing detailed description exemplifies the present invention. Further, the above-described contents are intended to show and describe preferred embodiments of the present invention, and the present invention may be used in various other combinations, modifications, and environments. That is, the scope of the inventive concept disclosed in this specification may be changed or modified within the scope equivalent to the disclosed contents and/or within the skill or knowledge of the related art. The above-described embodiments illustrate the best mode for implementing the technical idea of the present invention, and various modifications required for specific applications and uses of the present invention are also possible. Therefore, the detailed description of the invention is not intended to limit the invention to the disclosed embodiments. Further, the appended claims should be construed to include other embodiments.

DESCRIPTION OF REFERENCE NUMERALS

1: steering column for a vehicle
10: outer column
13: inner column
20: tilt bracket
30: telescopic member
31: operation lever
40: fixed gear
42: upper plate
41: slit hole
43: bending plate
44: lower plate
48: rivet hole
50: movable gear
51: gear teeth
52: bolt insertion hole
53: main hole
54: first protrusion hole
55: second protrusion hole
56: insertion groove
60, 60a: elastic support
61, 61a: elastic body
62, 62a: gear insert
63, 63a: fixture
70: adjuster bolt
71: first protrusion
72: second protrusion
80: stopper
90: fixing part

The invention claimed is:
1. A steering column for a vehicle comprising:
an outer column having an outer circumferential surface with a partially cut-out portion;
an inner column coupled to an inside of the outer column and provided movably in a shaft direction; and
a telescopic member formed to absorb an impact load upon a vehicle collision and coupled to the inner column,
wherein the telescopic member comprises:
a fixed gear coupled to the inner column and provided movably in the shaft direction together with the inner column when the inner column moves;
a movable gear provided to fix the inner column after the inner column moves in the shaft direction, and provided with a plurality of gear teeth coupled to slit holes of the fixed gear; and
an elastic support coupled to the movable gear to provide a fixing force in a direction toward the inner column, and provided so that the movable gear and the fixed gear are coupled to each other, wherein:

when the impact load is applied to the vehicle, the fixed gear is formed to absorb the impact load by causing the inner column to move a predetermined distance and then come into contact with a portion of the fixed gear, and the fixed gear comprises:

an upper plate having the slit holes and disposed on an outer circumferential surface of the inner column;

a bending plate coupled to an end of the upper plate and having a bent shape;

a lower plate positioned facing the upper plate and coupled to the bending plate; and a stopper positioned between the slit holes of the upper plate and the bending plate to absorb the impact load, and the stopper protrudes from the upper plate in a direction perpendicular to the shaft direction.

2. The steering column for a vehicle of claim 1, wherein the telescopic member further comprises a fixing part configured to fix the fixed gear to the inner column and absorb the impact load when the vehicle is subjected to the impact load.

3. The steering column for a vehicle of claim 1, wherein the elastic support is inserted into and coupled to an insertion groove formed in an upper portion of the movable gear.

4. The steering column for a vehicle of claim 3, wherein the elastic support comprises:

an elastic body configured to provide an elastic force;

a gear insert inserted into the insertion groove formed in an outer side surface of the movable gear to support the movable gear; and a fixture having one end coupled to the elastic body and another end coupled to the outer column.

5. The steering column for a vehicle of claim 1, wherein when the vehicle is subjected to the impact load, the inner column moves a predetermined distance and contacts the bending plate so that the fixed gear absorbs the impact load.

6. The steering column for a vehicle of claim 5, wherein the stopper has a width greater than that of the slit hole formed in the upper plate, positioned adjacent to the bending plate, and provided to absorb the impact load when the vehicle is subjected to the impact load.

7. The steering column for a vehicle of claim 1, wherein the outer column comprises a pair of distance parts protruding from the outer surface of the outer column and facing each other, and an outer circumferential surface having a partially cut-out portion between the pair of the distance parts;

the telescopic member further comprises an adjuster bolt passing through the pair of distance parts to be coupled thereto and coupled to an external operation lever; and the adjuster bolt is coupled to the movable gear while passing through a bolt insertion hole formed in the movable gear, and the bolt insertion hole comprises:

a main hole having a circular-shaped cross section; and one or more protrusion holes protruding from one end of the main hole and into which a protrusion formed on an outer circumferential surface of the adjuster bolt is inserted.

8. The steering column for a vehicle of claim 7, wherein an angle formed between a surface on which the gear teeth of the movable gear is formed and an upper surface of the fixed gear is within a predetermined angle range in a state before the gear teeth of the movable gear is coupled to the upper surface of the fixed gear, and the protrusion holes are formed to correspond to the angle.

9. The steering column for a vehicle of claim 8, wherein the predetermined angle range is between 10 to 15 degrees.

* * * * *